(12) United States Patent
Rittner et al.

(10) Patent No.: US 8,695,598 B2
(45) Date of Patent: Apr. 15, 2014

(54) COCKPIT OXYGEN BREATHING DEVICE

(75) Inventors: Wolfgang Rittner, Siblin (DE); Rudiger Meckes, Berkenthin (DE)

(73) Assignee: Zodiac Aerotechnics, Plaisir (FR)

( * ) Notice: Subject to any disclaimer, the term of this patent is extended or adjusted under 35 U.S.C. 154(b) by 602 days.

(21) Appl. No.: 12/504,701

(22) Filed: Jul. 17, 2009

(65) Prior Publication Data
US 2010/0024821 A1 Feb. 4, 2010

Related U.S. Application Data

(60) Provisional application No. 61/085,935, filed on Aug. 4, 2008.

(51) Int. Cl.
*A62B 7/00* (2006.01)
*A62B 9/00* (2006.01)
*G05B 1/00* (2006.01)
*A61M 16/00* (2006.01)

(52) U.S. Cl.
USPC .................................. 128/205.11; 128/204.18

(58) Field of Classification Search
USPC ............. 128/202.12, 204.18, 205.11–205.12, 128/205.26–205.28
See application file for complete search history.

(56) References Cited

U.S. PATENT DOCUMENTS

| | | | | |
|---|---|---|---|---|
| 3,166,676 A | * | 1/1965 | Robinson ................ | 128/204.14 |
| 4,440,164 A | * | 4/1984 | Werjefelt ................ | 128/205.25 |
| 4,651,728 A | * | 3/1987 | Gupta et al. ............ | 128/201.28 |
| 6,962,154 B2 | * | 11/2005 | Krebs ...................... | 128/203.12 |
| 7,789,085 B2 | * | 9/2010 | Vogt ........................ | 128/206.27 |
| 7,981,193 B2 | * | 7/2011 | Hedges ................... | 95/8 |
| 2004/0000312 A1 | | 1/2004 | Matheny et al. | |
| 2004/0245390 A1 | | 12/2004 | Meckes et al. | |

FOREIGN PATENT DOCUMENTS

GB 2249728 5/1992

* cited by examiner

*Primary Examiner* — Oren Ginsberg
(74) *Attorney, Agent, or Firm* — Kilpatrick Townsend & Stockton LLP; Dean W. Russell

(57) ABSTRACT

The invention relates to an oxygen breathing device, in particular for cockpit crew member of an aircraft, comprising a pressurized oxygen source for storing pressurized oxygen, an oxygen mask, adapted to fit to nose and mouth of a person to be supplied with oxygen from the pressurized oxygen source, an oxygen supply line connecting the pressurized oxygen source with the oxygen mask, a pressure regulator/safety valve coupled in the oxygen supply line to selectively open or shut off oxygen flow from the pressurized oxygen source to the oxygen mask and/or to control pressure of said oxygen supplied to the oxygen mask. According to the invention, such oxygen breathing device is improved by having a pneumatic seal adapted to pneumatically seal the pressurized oxygen source in a non-use condition, an opening device adapted to open the pneumatic seal in case of an emergency situation requiring oxygen supply to the person, a change over valve adapted to selectively supply oxygen from the pressurized oxygen source or pressurized air from a pressurized air source to the oxygen mask.

12 Claims, 1 Drawing Sheet

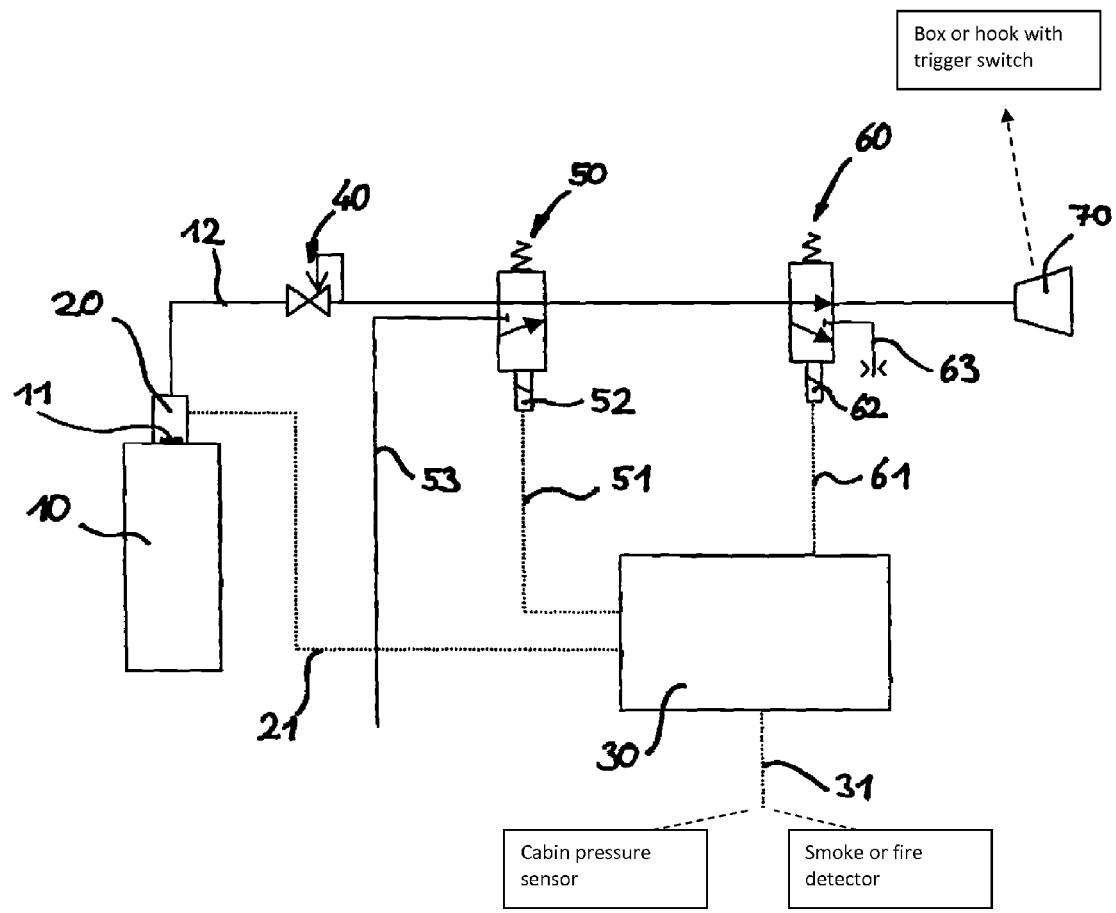

COCKPIT OXYGEN BREATHING DEVICE

CROSS-REFERENCE TO RELATED APPLICATIONS

This application claims the benefit of U.S. Provisional Application No. 61/085,935 filed on Aug. 4, 2008, the contents of which are incorporated herein by reference.

BACKGROUND OF THE INVENTION

The invention relates to an oxygen breathing device, in particular for cockpit crew member of an aircraft, comprising:
- a pressurized oxygen source for storing pressurized oxygen,
- an oxygen mask, adapted to fit to nose and mouth of a person to be supplied with oxygen from the pressurized oxygen source,
- an oxygen supply line connecting the pressurized oxygen source with the oxygen mask,
- a pressure regulator/safety valve coupled in the oxygen supply line to selectively open or shut off oxygen flow from the pressurized oxygen source to the oxygen mask and/or to control pressure of said oxygen supplied to the oxygen mask.

A further aspect of the invention is a method for providing oxygen to a passenger or crew member of an aircraft.

Oxygen breathing devices of the aforementioned type are used to provide oxygen to a crew member or passenger in an emergency situation. A particular application of oxygen breathing devices is the supply of oxygen to a crew member in a cockpit of an aircraft. In such applications of oxygen breathing devices in a cockpit use it is known to provide an oxygen source like a pressurized oxygen in a tank and to provide oxygen from such source to the cockpit member in an emergency situation.

To make sure that the oxygen breathing device is in proper condition to provide oxygen to the pilot it is required and prescribed to perform a pre-flight check of the oxygen breathing device. In such pre-flight check in particular the valves and the breathing mask worn by the pilot are checked for proper function by providing oxygen from the oxygen source.

Such pre-flight check is performed before each flight of an aircraft and after a certain number of pre-flight checks it is required to replace the pressurized oxygen source since the oxygen stored therein is no longer sufficient to provide oxygen for a period of time corresponding to an emergency situation. Thus, a first drawback of such existing oxygen breathing devices is the need to frequently replace the pressurized oxygen source, thus producing enhanced costs in the maintenance of the whole oxygen breathing device.

Still further, in existing oxygen breathing devices it is required to permanently provide pressurized oxygen to a valve member which can be activated to perform pre-flight check or in an emergency situation. However, a small amount of oxygen may flow through such a valve, thus resulting in a permanent loss of oxygen to a small amount. This permanent loss will slowly reduce the volume of oxygen stored in the pressurized oxygen source and thus will further require replacement of the pressurized oxygen source after a certain period of time, even if no pre-flight check has been performed.

Still further, while it is usually preferred to provide oxygen to crew member or passenger in emergency situations like a decompression of the aircraft, it is less preferable to provide oxygen in emergency situations like smoke or fire in the cockpit or aircraft. In such situations, the use of oxygen will increase the risk of burn injuries to the face of the crew member or passenger using the oxygen breathing device due to an increased concentration of oxygen in the area surrounding the face of the crew member or passenger. Thus, there is a need for an oxygen breathing device reducing the risk of burn injuries of the crew member or passenger using the device.

SUMMARY OF THE INVENTION

It is a first object of the invention to provide an oxygen breathing device reducing the need to frequently replace the pressurized oxygen source.

It is a further object of the invention to provide an oxygen breathing device reducing the risk of burn damages to the crew member or passenger using the device in case of particular emergency situations.

These and other objects of the invention are achieved by providing an oxygen breathing device as described in the introductory portion, further having a pneumatic seal adapted to pneumatically seal the pressurized oxygen source in a non-use condition, an opening device adapted to open the pneumatic seal in case of an emergency situation requiring oxygen supply to the person, a change over valve adapted to selectively supply oxygen from the pressurized oxygen source or pressurized air from a pressurized air source to the oxygen mask.

According to the invention, an oxygen breathing device is provided having a sealed pressurized oxygen source which thus eliminates the drawback of a permanent small flow of oxygen through a valve or the like coupled to the oxygen source. As a consequence of the oxygen source being sealed, the guaranteed lifetime of the oxygen source is significantly higher than the lifetime of non-sealed oxygen sources and the cycle time between installation or replacement of such oxygen source to its following replacement is significantly increased. This results in a significant decrease of maintenance costs of the oxygen breathing device according to the invention.

Although a pneumatically sealed pressurized oxygen source is provided, the functionality of performing a pre-flight check of the oxygen breathing device is not sacrificed in the oxygen breathing device according to the invention. For this purpose, a pressurized air source is provided in the oxygen breathing device which serves to perform a pre-flight check. A change over valve is arranged in the oxygen breathing device to selectively direct air from the pressurized air source through the tubes, pipes, valves, straps of the oxygen mask and any other devices related to the oxygen breathing device coupled in the flow path of the oxygen to the mask providing the oxygen to the passenger or crew member. Using this pressurized air allows to perform a pre-flight check. In case of an emergency situation, the change over valve may switch over to provide oxygen from the pressurized oxygen source to the oxygen breathing mask providing the oxygen to the passenger or crew member.

It is to be understood that according to this description and the claims a non-use condition is defined to be a condition wherein no emergency is present. Thus, a pre-flight check condition is to be understood as a non-use condition although the oxygen breathing device may be used during pre-flight check for a short period of time. Thus, the pressurized oxygen source remains pneumatically sealed during a pre-flight check and the seal is only broken in case of an emergency situation.

For opening the seal, the oxygen breathing device according to the invention comprises an opening device which can be a tube or the like having a sharp tip for perforating the seal and thus starting the flow of oxygen out of the pressurized oxygen source. The opening device may be manually or automatically activated and may comprise an actuating device like a pneumatically activated piston, an electromagnetic actuator or the like to move a member perforating the seal or to remove the seal itself. The seal may be a membrane or the like.

It is to be understood that the oxygen is supplied to the person using the device via the oxygen mask fitted to the mouth and nose region of the person, respectively. In the context of the description and the claims an oxygen mask is primarily a mask used by a crew member in the cockpit of an aircraft but this does not exclude that such an oxygen mask is provided to any other crew member or to a passenger in the passenger space of such an aircraft as well.

It is to be understood that the pressurized air or oxygen provided to the oxygen mask may not only serve to be inhaled by the person wearing the oxygen mask but to additionally provide for other functions like setting inflatable straps or the like under pressure for securely fixing the oxygen mask to mouth and nose of the person using the oxygen mask or any other function related to oxygen supply to the person in an emergency situation.

According to a first preferred embodiment, a control unit is provided which is adapted to receive pre-flight check signal by a user of the oxygen breathing device and to activate the change over valve upon receipt of said preflight check signal to switch into a condition wherein pressurized air is provided to the oxygen mask. Such a control unit will facilitate to perform a pre-flight check by doing the required steps upon receipt of one single signal and hereafter setting the oxygen breathing device into a condition where pressurized air is provided to the oxygen mask.

According to this preferred embodiment, the oxygen breathing device according to the invention is adapted to automatically provide pressurized air in a particular emergency situation signalized by a particular emergency signal. As described beforehand, in particular in case of smoke or fire in the aircraft it may be preferable to not provide pure oxygen to the person using the device since this will result in an increased risk of burn injuries to the face of the person. According to this preferred embodiment, the pressurized air source is not only used to perform pre-flight check but is further used to provide pressurized air to the person using the device in such specific emergency situations. Thus, a significant advantage is provided in that the oxygen breathing device according to the invention is capable to provide pure oxygen to the person using the device in emergency situations like a decompression situation and to alternatively provide pressurized air in specific emergency situations like smoke or fire in the cockpit or another region of the aircraft.

According to a further preferred embodiment, a control unit is provided adapted to receive an emergency decompression signal, in particular an emergency decompression signal provided manually by a crew member of an aircraft or automatically by a cabin pressure sensor and to activate upon receipt of said emergency decompression signal said opening device to open said seal of said pressurized oxygen source. The control unit according to this preferred embodiment may be a separate device or may be integrated into the control unit according to the foregoing preferred embodiment. According to this preferred embodiment, the oxygen breathing device is adapted to be automatically activated to provide oxygen to the person using the device in case of a decompression situation. The decompression situation may be signalized manually by a crew member to provide such emergency decompression signal or may be generated automatically by a sensor which measures the cabin pressure and compares this pressure to a desired range of pressure.

According to a further preferred embodiment, the oxygen breathing device comprises a control unit adapted to receive emergency signal by a user or a sensor, in particular a smoke detector or a fire detector, wherein the control unit is adapted to activate said changeover upon receipt of said emergency signal to switch into a condition wherein pressurized air is provided to the oxygen mask.

According to a further preferred embodiment, the pressurized air source is provided by a pressurized air cylinder, a bleed air supply line, an On-Board-Oxygen Generator-System, an On-Board-Inert Gas-Generator-System or a compressor filter stage. According to this preferred embodiment, the oxygen breathing device may comprise an integrated pressurized air cylinder to thus constitute a highly integrated device which is independent from external pressurized air sources. Alternatively, the pressurized air may be provided by external sources like a bleed air supply line providing bleed air from a turbine driving the aircraft, an OBOGS, an OBIGGS, and any other air compressing device provided onboard of the aircraft or by an external supply unit coupled to the aircraft in a ground condition or by a compressor filter stage. In particular in those embodiments where the pressurized air is used to supply air to the person using the device it is preferred to receive pressurized air from an onboard system or a pressurized air tank integrated into the oxygen breathing device, since this will allow to sufficiently supply the person with pressurized in particular emergency situations. However, it is to be understood that in case that the pressurized air is only for pre-flight check of the system, the pressurized air may alternatively be provided by an external device coupled to the aircraft in ground condition.

According to a still further preferred embodiment, a control unit is provided adapted to receive a signal from a pressure sensor for detecting the flight altitude of an aircraft equipped with said oxygen breathing device, the control unit being adapted to only allow activation of said change over valve if said signal of said pressure sensor signalises that the aircraft has reached or exceeded a certain altitude. According to this embodiment, it is ensured that the oxygen breathing device is only activated if the aircraft has reached or exceeded a certain altitude and thus the system cannot be inadvertently activated in a ground condition or at low altitudes. This embodiment may be improved in such a way that in ground condition or at low altitudes, where the signal is not present, only the pressurized air may be provided to the oxygen masks while at higher altitudes, if the signal of the altitude sensor is present, the seal of the pressurized oxygen source may be broken and pure oxygen flow to the oxygen mask may be activated by this.

According to a still further embodiment, a purge valve is arranged in the oxygen supply line between the changeover valve and the oxygen mask, wherein the purge valve is adapted to switch from a first condition wherein oxygen supplied via the oxygen supply line is provided to said oxygen mask into a second condition wherein oxygen supplied via the oxygen supply line is provided to a purge line. This embodiment specifically addresses the condition present in the oxygen breathing device after a pre-flight check with pressurized air and provides for pure oxygen supply to the person using the device in case of an emergency situation like a decompression situation. Since in such case, following the flow of air through the tubes, pipes and valves of the device, air is present in the device and would be supplied to the person using the device in the first phase of the emergency supply, this can be overcome by providing such purge valve for quickly purging the system with pure oxygen from the pressurized oxygen source and thus eliminate the air present in the system following pre-flight check. This will allow to immediately provide pure oxygen to the person using the device and is a particular advantage in specific emergency conditions.

In said preferred embodiment it is further preferred to provide a control unit adapted to activate said purge valve to direct gas provided via the oxygen supply line to said purge line. Said control unit according to this preferred embodiment may be a separate device or may be integrated into a control unit as described before of any of the preferred embodiments described before. The control unit will allow to automatically purge the system with pure oxygen in case of an emergency situation for a short, predetermined period of time and will hereafter automatically switch back to regular use condition wherein oxygen from the pressurized oxygen source is provided to the person using the device.

According to a further preferred embodiment of the oxygen breathing device according to the invention, a control unit is provided which is adapted to receive an emergency decompression signal and upon receipt of said emergency decompression signal to activate simultaneously said opening device to open said seal of said pressurized oxygen source, said changeover valve to switch into a condition wherein oxygen provided by said oxygen supply line is provided to said oxygen mask and said purge valve to provide a gas provided to the purge valve to the purge line, whereby the control unit is further adapted to switch back said purge valve after a predetermined time period into a condition, wherein gas provided to the purge valve is provided to said oxygen mask.

According to this preferred embodiment, the control unit is provided to automatically break the seal of the pressurized oxygen source in case of an emergency decompression situation by activating the opening device and to provide said oxygen from the pressurized oxygen source in a first short period of time to purge the system with pure oxygen and to hereafter switch over into a condition, wherein pure oxygen is provided to the oxygen mask.

According to a final preferred embodiment the oxygen is stored in a sealed pressurized oxygen source and in case of an emergency said seal of said oxygen source is opened and oxygen is provided to said passenger or crew member via an oxygen mask. This will allow that oxygen flow to the oxygen mask is activated by a trigger signal generated automatically when the oxygen mask is taken from a box or hook. Such trigger signal may be transferred via a control unit as described beforehand. In particular, such automatic activation may be combined with an altitude sensor in such a way that automatic oxygen flow may only be activated in high altitudes.

According to a further aspect of the invention, a method for providing oxygen to a passenger or crew member of an aircraft is provided, wherein the oxygen is stored in a sealed pressurized oxygen source and in case of an emergency said seal of said oxygen source is opened and oxygen is provided to said passenger or crew member via an oxygen mask. This method allows to store said oxygen over a period of several years in said sealed pressurized oxygen source and thus to elongate the maintenance period, respectively.

The method may be improved in that pressurized air from a pressurized air source is provided to said oxygen mask in a preflight check. This will allow to retain the seal undamaged but to nevertheless perform pre-flight check for checking of substantial elements of the breathing device for proper functioning, using the pressurized air from the pressurized air source.

Still further it is preferred that the seal of the pressurized oxygen source is automatically opened by an opening device upon receipt of an emergency decompression signal. This will allow for immediate and automatic supply of oxygen to the person using the device in case of an emergency situation like and emergency signal detected by a pressure sensor of measuring the pressure inside the cabin of a pressurized cabin aircraft.

According to a final preferred embodiment, the method according to the invention may be improved in that an oxygen supply line providing oxygen from the pressurized oxygen source to the oxygen mask is purged with oxygen for a predetermined period of time after the seal of the pressurized oxygen source was opened. This purging will eliminate air inside the oxygen breathing device following pre-flight check with pressurized air and to thus allow to immediately supply pure oxygen to the person using the device in an emergency situation.

BRIEF DESCRIPTION OF THE DRAWING

A preferred embodiment of the invention is described with reference to the accompanying FIGURE. The FIGURE shows a schematic set-up of an oxygen breathing device according to the invention.

As shown in the FIGURE, a sealed pressurized oxygen cylinder 10 is provided, comprising pressurized oxygen and being sealed by a seal 11.

DETAILED DESCRIPTION

An opening device 20 is directly attached to the pressurized oxygen cylinder 10 in the region of the seal 11 and is coupled to a control unit 30 via an opening control line 21.

Oxygen provided by the pressurized oxygen cylinder 10 after the seal 11 has been opened by the opening device 20 supplied via an oxygen supply line 12 to a pressure regulator with safety valve 40. From this pressure regulator with safety valve 40 the oxygen is further supplied to a change over valve 50 which is adapted to selectively provide said oxygen from the pressurized oxygen cylinder 10 to a purge valve 60 or to provide pressurized air supplied to the change over valve 50 via a pressurized air supply line 53 to the purge valve 60.

The pressurized air supply line may be coupled to a clean ECS, a bleed air supply, an OBIGGS or an OBOGS system, a cabin air blower with smoke filter or a pressurized cylinder integrated into the oxygen breathing device to provide pressurized air to the change over valve 50.

The change over valve 50 is coupled to the control unit 30 via a change over valve control line 51. As can be seen in the schematic FIGURE, the change over valve 50 is spring-biased into a condition wherein oxygen from the pressurized oxygen cylinder 10 is provided to the purge valve 60. An actuator 52 integrated into the change over valve 50 can be activated by the control unit 30 via the change over valve control line 51 to switch the change over valve into a condition wherein pressurized air from the pressurized air supply line 53 is provided to the purge valve 60.

The purge valve 60 is spring-biased into a condition wherein the oxygen or pressurized air supplied to the purge valve 60 is provided to a oxygen mask 70. The purge valve 60 is coupled to the control unit 30 via a purge valve control line 61 and a signal provided via said purge valve control line 61 will activate an actuator 62 integrated into the purge valve to switch the purge valve into a condition wherein the oxygen or pressurized air supplied to the purge valve 60 is provided to a purge line 63 to purge the system. It is to be understood that preferably the purge valve 60 is only switched into said condition if pure oxygen is supplied to the purge valve in order to supply the oxygen breathing device with pure oxygen in case of an emergency decompression situation.

The oxygen mask 70 is adapted to fit over mouth and nose of a crew member using the oxygen breathing device and to provide said crew member with oxygen or pressurized air in an emergency situation.

As can be further seen from the FIGURE, the control unit 30 is coupled to a centralized aircraft control system via a control line 31. Said control line 31 may in particular provide an aircraft altitude switch signal to signalize the altitude of the aircraft to the control unit and may additionally provide a manual oxygen selector switch signal to manually activate oxygen supply from the oxygen breathing device according to the invention.

The oxygen breathing device will preferably work according to the following steps:

In a pre-flight check for checking proper functioning of the breath control and the extendable and inflatable straps of the oxygen mask 70, pressurized air will be provided to the oxygen mask via supply line 53. Further, in case of smoke in the cockpit without having a decompression situation at the same time, pressurized air will be supplied to the oxygen mask as well. Such pressurized air will be received as filtered bleed air from the turbines driving the aircraft or from any other pressurized air onboard of the aircraft or any external device for pre-flight check.

In case of a decompression emergency situation, with or without smoke in the cockpit, pure oxygen from the pressurized oxygen cylinder 10 will be provided to the oxygen mask via supply line 12.

The seal 11 of the pressurized oxygen cylinder may be provided by a membrane or the like which can be perforated in case of an emergency situation.

The electronic control unit 30 receives an activating signal via control line 31 in case of a decompression situation and if the altitude switch sensor is activated to signalize a certain minimum flight level of the aircraft or if the control line was manually activated by the cockpit crew.

The opening device 20 will perforate the membrane 11 if the electronic control unit 30 was activated via control line 31. At the same time, the change over valve 50 will be switched by a signal provided via change over control line 51 into a condition where oxygen is allowed to flow through the change over valve 50 to the purge valve 60.

In order to purge the system with pure oxygen from the pressurized oxygen cylinder, the purge valve 60 is activated to purge the system with pure oxygen by the purge line 63 for a short period of time, so that lines being in flow direction before the purge valve can be filled with pure oxygen.

After said short period of time the purge valve 60 is closed and the pure oxygen is supplied to the oxygen mask 70. The pilot using the oxygen mask can now breath pure oxygen.

In case that no decompression emergency situation is present or the cockpit oxygen breathing device was not activated by cabin crew or cockpit crew, the electronic control unit 30 will activate the change over valve 50 via change over control line 51 in such a condition that filtered bleed air is supplied to the oxygen breathing device. The purge valve 60 will in such case direct said pressurized air into the oxygen mask 70. In this condition, the mask can be used for a pre-flight check, i.e. the pilot can check whether inflatable mask straps and the breath control integrated into the oxygen mask is properly functioning.

Further, the pilot can use the oxygen mask in this condition if smoke is present in the cockpit to be protected from aggressive smoke or gases. In said both use conditions the oxygen from the pressurized oxygen cylinder is not required and thus does not have to be renewed or replaced. In case of fire in the cockpit, the security of the pilots is significantly increased since the pilot is not supplied with pure oxygen and thus no gases feeding the fire will be present in the region surrounding the face of the pilot.

The invention claimed is:

1. An oxygen breathing device for cockpit crew member of an aircraft, comprising:
   a pressurized oxygen source for storing pressurized oxygen,
   an oxygen mask adapted to fit to a nose and mouth of a person to be supplied with oxygen from the pressurized oxygen source,
   an oxygen supply line connecting the pressurized oxygen source with the oxygen mask,
   a pressure regulator/safety valve coupled in the oxygen supply line to selectively open or shut off oxygen flow from the pressurized oxygen source to the oxygen mask and/or to control pressure of said oxygen supplied to the oxygen mask,
   a pneumatic seal comprising a membrane that pneumatically seals the pressurized oxygen source in a non-use condition,
   an opening device adapted to open or remove the pneumatic seal by puncturing or removing the membrane in case of an emergency situation requiring oxygen supply to the person,
   a change over valve adapted to selectively supply oxygen from the pressurized oxygen source or pressurized air from a pressurized air source to the oxygen mask; and
   a control unit adapted to receive a pre-flight check signal by a user of the oxygen breathing device and to activate the change over valve upon receipt of said pre-flight check signal to switch into a condition wherein pressurized air is provided to the oxygen mask.

2. An oxygen breathing device according to claim 1, wherein the control unit is adapted to receive an emergency decompression signal comprising either an emergency decompression signal provided manually by a crew member of an aircraft or automatically by a cabin pressure sensor, and to activate upon receipt of said emergency decompression signal said opening device to open or remove said seal of said pressurized oxygen source by puncturing or removing the membrane.

3. An oxygen breathing device according to claim 1, wherein the control unit is adapted to receive an emergency signal by a user or a sensor comprising a smoke detector or a fire detector, wherein the control unit is adapted to activate said change over valve upon receipt of said emergency signal to switch into a condition wherein pressurized air is provided to the oxygen mask.

4. An oxygen breathing device according to claim 1, wherein the pressurized air source is provided by a pressurized air cylinder, a bleed air supply line, an On-Board-Oxygen-Generator-System, an On-Board-Inert Gas-Generator-System or a compressor filter stage.

5. An oxygen breathing device according to claim 1, wherein the control unit is adapted to receive a signal from a pressure sensor for detecting the flight altitude of an aircraft equipped with said oxygen breathing device, the control unit being adapted to only allow activation said change over valve if said signal of said pressure sensor signals that the aircraft has reached or exceeded a certain altitude.

6. An oxygen breathing device according to claim 1, further comprising a purge valve arranged in the oxygen supply line between the change over valve and the oxygen mask, wherein the purge valve is adapted to switch from a first condition wherein oxygen supplied via the oxygen supply line is provided to said oxygen mask into a second condition wherein oxygen supplied via the oxygen supply line is provided to a purge line.

7. An oxygen breathing device according to claim 1, wherein the control unit is adapted to activate a purge valve to direct gas provided via the oxygen supply line to a purge line.

8. An oxygen breathing device according to claim 1, wherein the control unit is adapted to receive an emergency decompression signal and upon receipt of said emergency decompression signal to activate simultaneously said opening device to open said seal of said pressurized oxygen source, said change over valve to switch into a condition wherein oxygen provided by said oxygen supply line is provided to said oxygen mask, and a purge valve to provide a gas provided to the purge valve to a purge line, whereby the control unit is further adapted to switch back said purge valve after a predetermined time period into a condition, wherein gas provided to the purge valve is provided to said oxygen mask.

9. An oxygen breathing device according to claim 1, wherein the oxygen mask is stored in a box or on a hook, said box or hook being associated to a switch generating a trigger signal to activate oxygen flow if the oxygen mask is taken from the box or hook.

10. An oxygen breathing device according to claim 1, wherein the pneumatic seal and the opening device are positioned upstream of the pressure regulator/safety valve.

11. An oxygen breathing device for cockpit crew member of an aircraft, comprising:
a pressurized oxygen source for storing pressurized oxygen,
an oxygen mask adapted to fit to a nose and mouth of a person to be supplied with oxygen from the pressurized oxygen source,
an oxygen supply line connecting the pressurized oxygen source with the oxygen mask,
a pressure regulator/safety valve coupled in the oxygen supply line to selectively open or shut off oxygen flow from the pressurized oxygen source to the oxygen mask and/or to control pressure of said oxygen supplied to the oxygen mask,
a pneumatic seal comprising a membrane that pneumatically seals the pressurized oxygen source in a non-use condition,
an opening device adapted to open or remove the pneumatic seal by puncturing or removing the membrane in case of an emergency situation requiring oxygen supply to the person, the pneumatic seal and the opening device positioned upstream of the pressure regulator/safety valve, and
a change over valve adapted to selectively supply oxygen from the pressurized oxygen source or pressurized air from a pressurized air source to the oxygen mask.

12. An oxygen breathing device according to claim 11, further comprising a control unit adapted to receive a pre-flight check signal by a user of the oxygen breathing device and to activate the change over valve upon receipt of said pre-flight check signal to switch into a condition wherein pressurized air is provided to the oxygen mask.

* * * * *